United States Patent Office 3,277,083
Patented Oct. 4, 1966

---

3,277,083
3-(2-OXOCYCLOPENTYL)-2H-1,4-BENZOXAZIN-2-ONES
Robert B. Moffett, Kalamazoo, Mich., assignor to The Upjohn Company, Kalamazoo, Mich., a corporation of Delaware
No Drawing. Filed Dec. 10, 1963, Ser. No. 329,381
4 Claims. (Cl. 260—244)

This invention relates to novel chemical compounds and to a process for preparing the same and is particularly directed to 3-(2-oxocyclopentyl)-2H-1,4-benzoxazin-2-ones and the preparation thereof.

The novel compounds of the invention have the following structural formula:

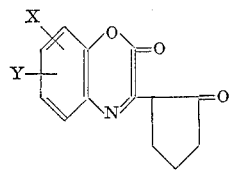

Formula I wherein X and Y are members selected from the group consisting of hydrogen, halogen, nitro, hydroxy, lower-alkyl of from 1 to 4 carbon atoms, inclusive, lower-alkoxy of from 1 to 4 carbon atoms, inclusive, sulfonic acid, and sulfonic acid salts.

Examples of lower-alkyl are methyl, ethyl, propyl, and butyl, including isomeric forms thereof. Examples of lower-alkoxy are methoxy, ethoxy, propoxy, and butoxy, including isomeric forms thereof.

The novel compounds of the Formula I are prepared by condensing a 2-aminophenol of the formula:

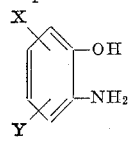

with a lower-alkyl 2-oxocyclopentaneglyoxylate of the formula:

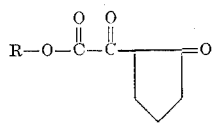

wherein X and Y are as defined above and R is lower-alkyl.

The condensation is accelerated by gentle heating (from room temperature, about 25° C., to about 180° C.), and can if desired be carried out in a non-oxidizing atmosphere, for example, nitrogen. The proportion of reactants can be varied over a wide range. Equimolar amounts are suitable though sometimes it is desirable to use an excess of one or the other reactant, say up to about 100% excess. An inert solvent, for example, toluene, ethanol, dioxane, and tetrahydrofuran can be used if desired.

The compounds of Formula I having a sulfonic acid moiety can be prepared by the foregoing procedure in the presence of a base, e.g., ammonium hydroxide, sodium hydroxide, potassium hydroxide, calcium hydroxide, methylamine, diethylamine, ethanolamine, tetramethylammonium hydroxide, and the like. The base should be present in an amount at least sufficient to convert the sulfonic reactant to its salt form. Advantageously, the condensation is carried out in the presence of an aqueous solvent, e.g., aqueous methanol or aqueous ethanol. The condensation in the presence of the base yields the alkali metal, alkaline earth, or substituted- or unsubstituted-ammonium salt of 2-oxo-3-(2-oxocyclopentyl)-2H-1,4-benzoxazinesulfonic acid corresponding to the particular base employed. The free 2-oxo-3-(2-oxocyclopentyl)-2H-1,4-benzoxazinesulfonic acid can be prepared by contacting an aqueous solution of a water-soluble salt of the acid (e.g., ammonium or sodium salt) with a cation-exchange resin, preferably a sulfonic acid type cation-exchange resin, and then isolating the acid from the resulting aqueous solution by conventional means, e.g., by evaporation.

The compounds of the Formula I are useful as sedatives and tranquilizers and can be used to calm agitated mammals or animals, e.g., laboratory rats and mice. The compounds also have anti-neoplasm activity in vitro, e.g., inhibit the growth of KB tumor cells.

The compounds of Formula I are also useful as intermediates in the preparation of other useful compounds. For example, they can be reduced by the general procedure of Biekert and Butenandt, British Patent No. 815,279, e.g., the novel 3-(2-oxocyclopentyl)-2H-1,4-benzoxazin-2-ones in tetrahydrofuran can be hydrogenated at about 70° C. and 50 atmospheres pressure in an autoclave with palladized carbon to obtain 3-(2-oxocyclopentyl) benzomorpholin-2-ones which are useful in accordance with U.S. Patents 1,915,334 and 2,075,359 in forming amine fluosilicate mothproofing agents and in accordance with U.S. Patents 2,425,320 and 2,605,155 in forming amine thiocyanateformaldehyde condensation products for use as pickling inhibitors.

The compounds of Formula I are also useful for light filters, giving several absorption peaks between 200 and 420 millimicrons. For this purpose they can be used in solutions, suspensions, ointments or they can be dispersed in plastic films.

The invention can be more fully understood by reference to the following examples which are given by way of illustration and not of limitation.

*Example 1.—3-(2-oxocyclopentyl)-2H-1,4-benzoxazin-2-one*

A mixture of 18.42 gm. (0.1 mole) of ethyl 2-oxocyclopentaneglyoxylate and 10.9 gm. (0.1 mole) of o-aminophenol was melted by warming on a steam bath for 15 minutes. During heating a dark red solution formed and crystallized. The mixture was boiled with 50 ml. of ethanol, cooled, and filtered to provide 15 gm. of orange yellow solid. The solid was recrystallized from 140 ml. of n-butanol to give 13.7 gm. (60% of theory) of 3-(2-oxocyclopentyl)-2H-1,4-benzoxazin-2-one as gold colored crystals having a melting point of 174–175° C.

*Analysis.*—Calcd. for $C_{13}H_{11}NO_3$: C, 68.11; H, 4.84; N, 6.11. Found: C, 68.01; H, 4.41; N, 6.39.

Following the procedure of the preceding example, substituting for the o-aminophenol an equimolar amount each of 2-amino-4-bromophenol,
2-amino-3,5-dibromophenol,
2-amino-6-nitrophenol,
2-amino-4-chloro-5-nitrophenol,
2-amino-4-chloro-6-nitrophenol,
2-amino-4-nitro-6-bromophenol,
2-amino-4-bromo-6-nitrophenol,
2-amino-4,6-dinitrophenol,
2-amino-4-bromo-6-methylphenol,
2-amino-4-nitro-6-methylphenol,
2-amino-4-nitro-6-methoxyphenol,
2-amino-5-methoxyphenol,
2-amino-5-ethoxyphenol,
2-amino-4-hydroxy-6-methylphenol,
2-amino-3-methyl-5-methoxyphenol,
2-amino-3-hydroxy-5-methylphenol,
2-amino-4,5-dimethoxyphenol, and
2-amino-3-methoxy-5-hydroxyphenol, there can be obtained 6-bromo-3-(2-oxocyclopenty)-2H-1,4-benzoxazin-2-one,
5,7-dibromo-3-(2-oxocyclopentyl)-2H-1,4-benzoxazin-2-one,
8-nitro-3-(2-oxocyclopentyl)-2H-1,4-benzoxazin-2-one,
6-chloro-7-nitro-3-(2-oxocyclopentyl)-2H-1,4-benzoxazin-2-one,
6-chloro-8-nitro-3-(2-oxocyclopentyl)-2H-1,4-benzoxazin-2-one,
6-nitro-8-bromo-3-(2-oxocyclopentyl)-2H-1,4-benzoxazin-2-one,
6-nitro-8-chloro-3-(2-oxocyclopentyl)-2H-1,4-benzoxazin-2-one,
6,8-dinitro-3-(2-oxocyclopentyl)-2H-1,4-benzoxazin-2-one,
6-bromo-8-methyl-3-(2-oxocyclopentyl)-2H-1,4-benzoxazin-2-one,
6-nitro-8-methyl-3-(2-oxocyclopentyl)2-H-1,4-benzoxazin-2-one,
6-nitro-8-methoxy-3-(2-oxocyclopentyl)-2H-1,4-benzoxazin-2-one,
7-methoxy-3-(2-oxocyclopentyl)-2H-1,4-benzoxazin-2-one,
7-ethoxy-3-(2-oxocyclopentyl)-2H-1,4-benzoxazin-2-one,
6-hydroxy-8-methyl-3-(2-oxocyclopentyl)-2H-1,4-benzoxazin-2-one,
5-methyl-7-methoxy-3-(2-oxocyclopentyl)-2H-1,4-benzoxazin-2-one,
5-hydroxy-7-methyl-3-(2-oxocyclopentyl)-2H-1,4-benzoxazin-2-one,
6,7-dimethoxy-3-(2-oxocyclopentyl)-2H-1,4-benzoxazin-2-one, and
5-methoxy-7-hydroxy-3-(2-oxocyclopentyl)-2H-1,4-benzoxazin-2-one, respectively.

*Example 2.—6,8-dichloro-3-(2-oxocylopentyl)-2H-1,4-benzoxazin-2-one*

A mixture of 18.42 gm. (0.1 mole) of ethyl 2-oxocyclopentaneglyoxylate, 17.8 gm. (0.1 mole) of 2-amino-4,6-dichlorophenol, and 35 ml. of absolute ethanol was heated with stirring on a steam bath for 15 minutes, cooled, and allowed to stand at room temperature for 1 hour. The mixture was filtered and 19.8 gm. of brown crystals collected. The crystals were recrystallized from 230 ml. of 2-methoxyethanol, giving 14.4 gm. (48.3% of theory) of 6,8 - dichloro - 3-(2-oxocyclopentyl)-2H-1,4-benzoxazin-2-one as orange crystals having a melting point of 206.5–208.5° C.

*Analysis.*—Calcd. for $C_{13}H_9Cl_2NO_3$: C, 52.37; H, 3.04; Cl, 23.78; N, 4.70. Found: C, 52.78; H, 3.26; Cl, 23.57; N, 4.96.

*Example 3.—7-nitro-3-(2-oxocyclopentyl)-2H-1,4-benzoxazin-2-one*

A solution of 18.42 gm. (0.1 mole) of ethyl 2-oxocyclopentaneglyoxylate and 15.4 gm. (0.1 mole) of 2-amino-5-nitrophenol in 35 ml. of absolute ethanol was heated to the boiling point, cooled, and stirred at room temperature for four days and filtered. 4.4 gm. of solid were collected on the filter. The filtrate was evaporated to dryness and the residue was heated in a bath at 130° C. for one hour, boiled with 100 ml. of ethanol and filtered, to give an additional 13.3 gm. of solid. The two solid fractions were combined and recrystallized from 75 ml. of dimethylformamide to give 11 gm. of dark solid which was sublimed in a bath, up to 130° C. at 0.001 mm., to give 9.4 gm. of orange solid. The orange solid was recrystallized from 55 ml. of dimethylformamide to give 8.98 gm. (32.3% of theory) of 7-nitro-3-(2-oxocyclopentyl)-2H-1,4-benzoxazin-2-one as dark greenish crystals having a melting point of 241–245° C.

*Analysis.*—Calcd. for $C_{13}H_{10}N_2O_5$: C, 56.93; H, 3.68; N, 10.22. Found: C, 57.02; H, 3.52; N, 10.15.

*Example 4.—Ammonium salt of 2-oxo-3-(2-oxocyclopentyl)-2H-1,4-benzoxazin-6-sulfonic acid*

The compound can be prepared by dissolved 14 gm. (0.05 mole) of 67.5% o-aminophenol-p-sulfonic acid, 18.4 gm. (0.1 mole) of ethyl 2-oxocyclopentaneglyoxylate, and 4 ml. (0.06 mole) of concentrated ammonium hydroxide in 25 ml. of ethanol and 10 ml. of water and boiling the solution to dryness at 150° C. (over a period of about 2 hours). The compound can be isolated by adding 500 ml. of absolute ethanol, heating to boiling, cooling, filtering, concentrating the filtrate to about 200 ml., cooling, and collecting on a filter.

Following the above procedure, substituting for the ammonium hydroxide, an equivalent amount each of sodium, potassium, calcium, and barium hydroxides, methylamine and triethanolamine, there can be obtained the respective alkali metal, alkaline earth, and substituted ammonium salts of 2-oxo-3-(2-oxocyclopentyl)-2H-1,4-benzoxazine-6-sulfonic acid.

Similarly, substituting in the above procedure for the o-aminophenol-p-sulfonic acid, an equimolar amount each of 2-amino-6-chlorophenol-4-sulfonic acid, 2-amino-5-nitrophenol-4-sulfonic acid, 2-amino-6-nitrophenol-4-sulfonic acid, and 2-amino-6-methylphenol-4-sulfonic acid, there can be obtained the ammonium salts of 2-oxo-3-(2-oxocyclopentyl) - 8-chloro-2H-1,4-benzoxazine-6-sulfonic acid, 2-oxo-3-(2-oxocyclopentyl)-7-nitro-2H-1,4-benzoxazine-6-sulfonic acid, 2-oxo-3-(2-oxocyclopentyl)-8-nitro-2H-1,4-benzoxazine-6-sulfonic acid, and 2-oxo-3-(2-oxocyclopentyl)-8-methyl-2H-1,4-benzoxazine-6-sulfonic acid and, as above, similarly substituting the alkali metal, alkaline earth, and amine bases, the respective alkali metal, alkaline earth and substituted ammonium salts can be obtained.

What is claimed is:
1. A compound of the formula

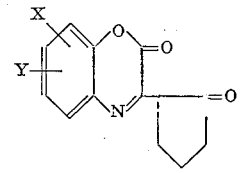

wherein X and Y are members selected from the group consisting of hydrogen, halogen, nitro, hydroxy, lower-alkyl, lower-alkoxy, sulfonic acid.
2. 3-(2-oxocyclopentyl)-2H-1,4-benzoxazin-2-one.
3. 6,8 - dichloro-3-(2-oxocyclopentyl)-2H-1,4-benzoxazin-2-one.
4. 7 - nitro-3-(2-oxocyclopentyl)-2H-1,4-benzoxazin-2-one.

References Cited by the Examiner

UNITED STATES PATENTS 3,105,071  9/1963  Moffett _____ 260—244

FOREIGN PATENTS 815,279  6/1959  Great Britain.

WALTER A. MODANCE, *Primary Examiner.*
ROBERT T. BOND, *Assistant Examiner.*